United States Patent Office 3,182,812
Patented May 11, 1965

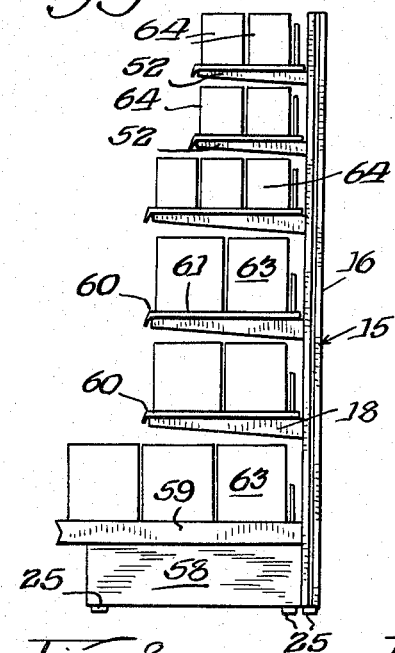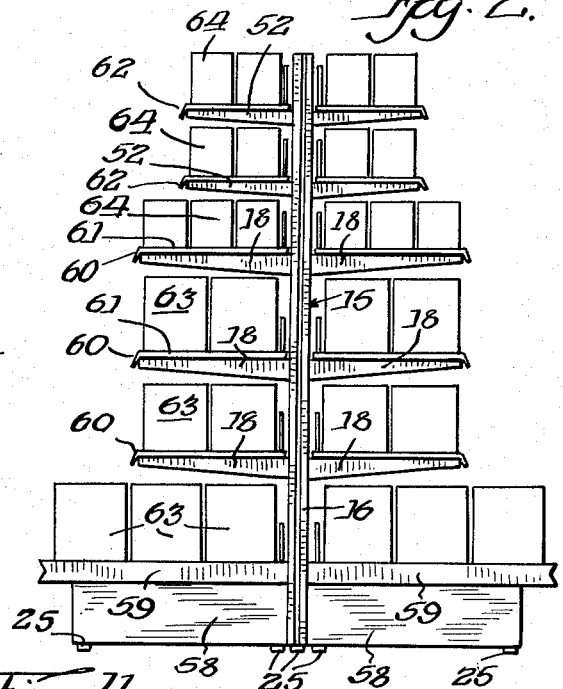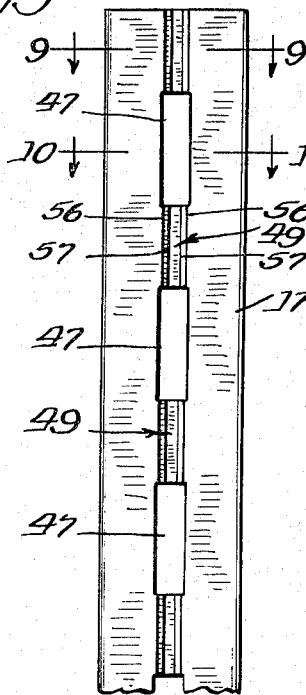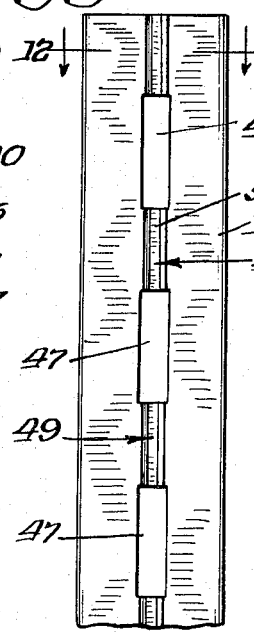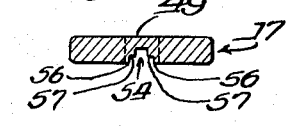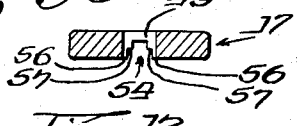
Inventor.
Jay G. Fenwick.

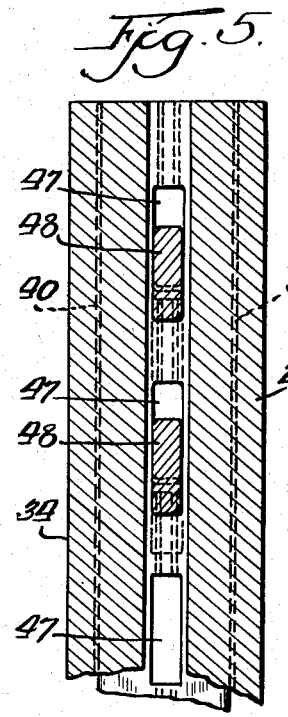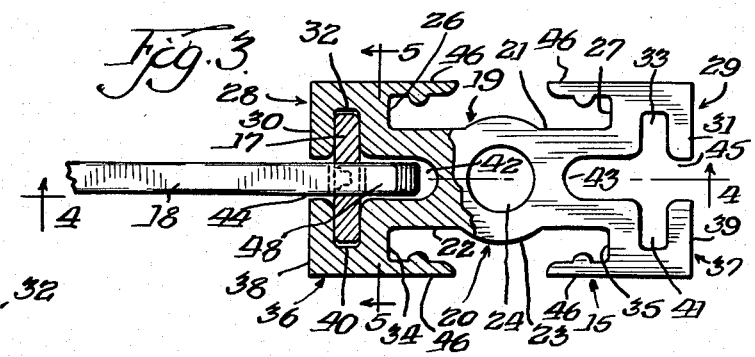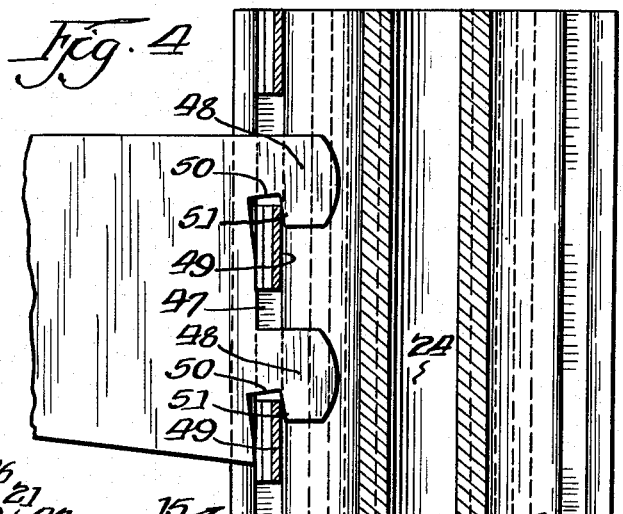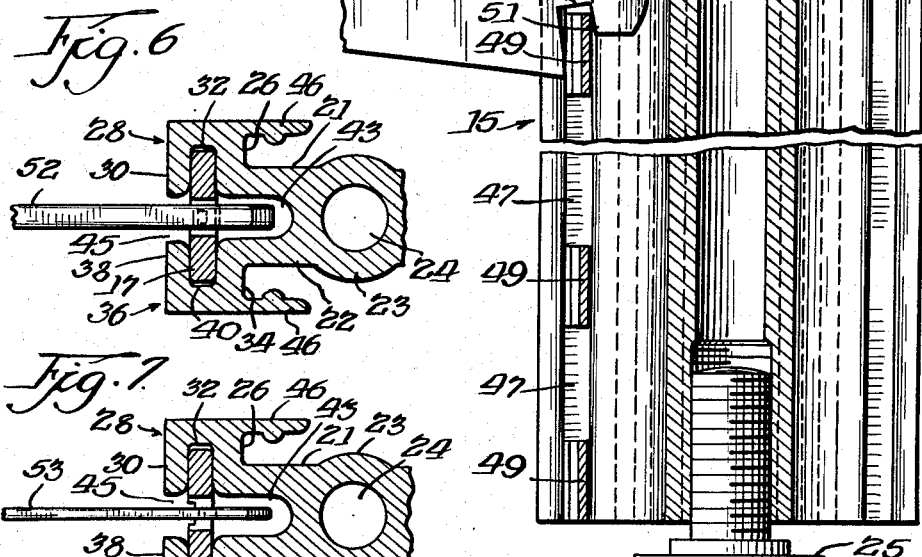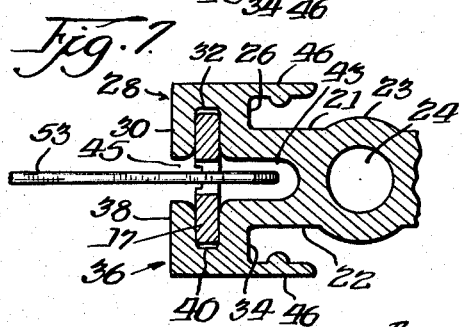

3,182,812
COMBINATION SLOTTED STANDARDS
Jay G. Fenwick, Chicago, Ill., assignor to Morton Manufacturing Company, Chicago, Ill., a corporation of Illinois
Filed Jan. 29, 1964, Ser. No. 341,072
5 Claims. (Cl. 211—148)

My invention relates to a composite structural member for use in combination with support members such as standard brackets, bulkheads, for use with drawers, for merchandise display tables, display cabinets, shelving, file cabinets, as well as for open cabinets and tables and many other purposes where display cabinets or the like are used in the merchandising field, a retail item for use in the home, workshop, business office, factory, schools, hospitals, etc., and wherein the display units are built up to meet particular needs or fitted into particular areas.

Another and further object of my invention is the provision of a composite structural member, the main element of which consists preferably of an especially designed extruded aluminum standard as the main support element which is combined with a thin strip made of steel, aluminum, or other material, fitted into a channel in the standard. The strip in the standard possesses a high shear resistance and to which the ends of shelf supporting brackets are attached in cantilever arrangement with suitable shelves placed upon the brackets for the support and display of merchandise.

Another and further object of my invention is the provision of a composite post or support member to which a plurality of fixtures and shelf brackets of the different lengths, and three standard gauge thicknesses which are now being produced by the store fixture industry, can be attached to provide a structure to support and display various sizes and weights of merchandise in varying heights and in single or double form of shelves without the necessity of having a large number of posts and brackets to be used therewith to suit the particular circumstances of the use to which such display elements are built.

It has been a standard practice over the years for the store planner, builder, architect, engineer, designer, merchant and manufacturer to use slotted tubing and brackets in one of the three gauges available, also in various sizes, shapes and design, to solve a particular problem without any consideration for standardization. As a result, most completed installations are a mixture of the three basic gauge systems of different design. Later changes are either impossible or extremely expensive.

Another object of my invention is the use of one standard post principally for use with three different dimensions of brackets and which are interchangeable so that it is not necessary to keep a stock of such brackets on hand for the building of shelving and the like.

Another and further object of my invention is the provision of a composite structural member for miscellaneous purposes comprising an extruded main post made from aluminum or some other metal which can be extruded and a shear-resistant strip fitted into the main post, made preferably of steel which can be rolled to shape, and thereafter machined to precise form with spaced slots or openings therein which can be produced more easily and cheaply than a single unit rolled or machined to form, which is costly, and therefore can be sold at a much lower cost than those structures for the same general purpose heretofore used.

Another and further object of my invention is the provision of a composite structural member around which a plurality of merchandise assemblies may be built, and such assemblies may be dismantled and other assemblies built with the same parts, with the addition of shelves, table tops and the like to form a complete and different structure.

These and other objects of my invention will be more fully and better understood by reference to the accompanying drawings in which:

FIGURE 1 is an elevational view of a stack of a series of shelves supported at one side of a composite post;
FIGURE 2 is an elevational view of a stack of shelves for merchandise display in which shelves are mounted on opposite sides of the post;
FIGURE 3 is a cross-sectional view of the composite post and a heavy duty gauge bracket mounted therein;
FIGURE 4 is a sectional view of a portion of the post and bracket on line 4—4 of FIGURE 3;
FIGURE 5 is a fragmental cross-sectional view on line 5—5 of FIGURE 3;
FIGURE 6 is a cross-sectional view showing a portion of the composite post and a bracket of the medium type fitted therein;
FIGURE 7 is a cross-sectional view through a portion of a composite post showing a lightweight bracket mounted therein;
FIGURE 8 is an elevational view of the face of the bracket support strip showing a stepped longitudinal channel therein;
FIGURE 9 is a cross-sectional view through a bracket support strip on line 9—9 of FIGURE 8;
FIGURE 10 is a cross-sectional view of the strip shown in FIGURE 8 on lines 10—10 thereof through one of the bracket-receiving openings in the strip;
FIGURE 11 is an elevational view of the face of a bracket strip showing a truncated shaped longitudinal bracket receiving channel therein; and
FIGURE 12 is a cross-sectional view of the bracket strip taken on lines 12—12 of FIGURE 11.

Referring now specifically to the drawings and in which like reference characters refer to like parts throughout, a composite structure member designated as a whole as 15 is shown consisting of a basic component in the form of a configurated post 16 and a bracket support strip 17 incorporated therewith, with a portion of a bracket such as 18 secured therein for the support of shelves, table tops, bulkheads for drawers in cantilever fashion, file cabinets, and for many other purposes pertinent to the display and storage of merchandise in trade and business establishments.

The post 16 is integrally formed preferably of extruded aluminum and comprises two channel portions 19 and 20 in back-to-back spaced relation with each other, each channel portion having web parts 21 and 22 with a center portion 23 having an opening 24 throughout the full length of the post and having a leveling plug 25 or leveling adapter at its lower end in threaded engagement with the post which may be omitted when the post 16 is either used in a free standing position (FIGURES 1 and 2) or where the post 16 is supported by a floor at its lower end and by the ceiling at its upper end. When opening 24 is used as a raceway for wiring in installations where the leveling device or plug 25 is used, access to the opening 24 may be had by an opening in the side of the post 16 through which the wiring may pass.

The web 21 has the usual flanges 26 and 27 thereon with L-shaped portions 28 and 29 integrally formed with the flanges 26 and 27 with inwardly extending leg portions 30 and 31 spaced outward of the flange portions 26 and 27 whereby channels 32 and 33 are formed for purposes hereinafter described. The web 22 has outwardly turned flanges 34 and 35 thereon with L-shaped extensions 36 and 37 formed therewith with inwardly extending leg portions 38 and 39 spaced outward of the flange portions 34 and 35 whereby channels 40 and 41 are formed which are the same width and depth as are the channels 32 and 33 and are open toward each of said channels 32 and 33, respectively, with which they continue to form complete channels to receive bracket strips 17 and extend the entire length of the post 16.

The center 21 of the post 16 acts as a spacer for the channel sections 19 and 20 thereby forming channels 42 and 43 between the webs 21 and 22 at their outer ends which extend the length of the post 16 to receive the inner ends of brackets such as 18 when assembled in a final structure such as a shelf. The ends of the leg portions 30 and 38 and 31 and 39 are spaced apart a distance equal to the width of the channels 42 and 43 whereby open channels 44 and 45 are formed which extend the length of the post 16 and through which the brackets such as 18 extend and which are secured in the bracket strips 17. A plurality of wing portions 46, 46 are provided on each side of the post 16 which provides means for the attachment of wall panels to the said post for erecting partitions, backs for shelf stands, and the like, which are described in detail in my co-pending application serial No. 348,445, filed March 2, 1964.

The bracket strip 17 is preferably made of steel or any other metal having high shear strength and is approximately ¾" wide and ⅛" in thickness in the form shown and preferably with spaced opening 47, 47 therein through which the hooks 48, 48 on the brackets are adapted to extend in assembled relation of a composite structure. Web portions 49, 49 are provided throughout the length of the bracket strip 17 in spaced relation with each other between each of the openings 47, 47. The hooks 48, 48 have recesses 50, 50 cut in their lower edges to receive the web portions 49, 49 with the surfaces 51, 51 on the hooks 48, 48 engaging the webs 49, 49 so the brackets such as 18 are supported in cantilever fashion by the webs 49, 49 forming a part of the bracket strips 17.

Bracket strips such as 17 may be provided with spaced openings such as 47 therein for use with a particular kind of bracket such as one of the three usual types described herein or such strips may be made for special brackets having two or more hooks thereon spaced from each other as may be desired. In such case, the bracket strip for use therewith should be of such width and thickness as to possess the requisite strength, with openings therein of the proper size and shape to permit the bracket hooks to pass through such openings. For instance, in the strips 17, 17 as shown, the openings 47 are spaced from each other on one inch centers. This spacing could be changed if necessary or desirable for different brackets. Such strips would probably not have channels in the web portion, but each side of the webs would be in a single plane.

The webs 49 as shown can be produced by very high pressure exerted upon these areas and the metal of the webs compressed or "coined" by such pressure until the wall thickness of the strip 17 is reduced approximately one-half its normal thickness or the metal may be milled out if desired. The strip may also be extruded from steel, high and low strength aluminum or plastic depending on the end use of this equipment. The webs may have grooves longitudinally of their front faces having straight sides within which the body of the bracket would be fitted which would stabilize the movement thereof when in assembled relation to hold the shelves firmly and against vibration.

The width of the openings 47, 47 is important in that the width should be very slightly greater than is the thickness of the heavy duty gauge line of hardware. This dimension provides for easy insertion of the hooks on the brackets of all three gauges and permits the brackets to be held in a locked up and down position. Side movement of the brackets being restricted in part by the ends of leg portions 30 and 38 and 31 and 39 of post 16.

The bracket strips 17, 17 of my invention are preferably designed to receive all three sizes of brackets described above. This result is accomplished by providing a stepped groove 54 in the face of the webs 49 as shown in detail in FIGURES 8, 9, and 10 or by placing a truncated V-shaped groove 55 in the face of the webs 47 as shown in FIGURES 11 and 12 of the drawings.

Referring particularly to FIGURES 9 and 10, a stepped wall for the groove 54 is shown. The distance across the groove 54 is slightly less than is the thickness of the heavy duty brackets 18, 18 illustrated in FIGURE 3 of the drawings so that when the bracket hooks 48, 48 are inserted through the openings 47, 47 in the bracket strip 17 and pushed down over a wall portion 49 the hooks 48 will span the groove 54 because the thickness of the bracket 18 is slightly greater than is the width of the groove 54 so the bracket 18 engages the body of the strip 17 at 56, 56 alongside the edges of the groove 54. The face 51 of the hook portion 48 engages the rear of the web portion 49 and therefore the hook portions 48, 48 of the bracket such as 18 are fitted down fairly snugly over the upper ends of the webbed portions 49, 49 of the strip 17 so the bracket is held in cantilever action to the strips 17.

In the use of the intermediate bracket 52 shown in FIGURE 6, the hook portions of the bracket 52 extends through the openings 47, 47 in the bracket strip 17 and the body of the bracket 52 engages the steps 57, 57 in the side walls of the groove 54 while the hooks engage against the back of the web 49. The thickness of the medium bracket 52 is less than the thickness of the heavy duty bracket 18 and the span of the openings 50, 50 in the hook portions are slightly less than is the hook portions 48, 48 of the heavy duty bracket 18 so that the intermediate bracket 52 is held in firm engaged relation with the bracket strips 17, 17. In the use of the light bracket 53 which is of lesser thickness than are the other two brackets, the bracket 53 will engage the strip 17 at the bottom of the groove 54 in the web portion 49 of the bracket strip 17 and be held firmly in position. The span of the hooks on the light bracket is lesser than it is for the heavier brackets and is made to accommodate the thinnest portion of the wall of the web portions 49, 49.

The groove 55 and the strip 17 illustrated in FIGURES 11 and 12 has a truncated V-shaped groove 55 therein with the throat of the V being of sufficient width to permit the medium duty bracket 52 to extend partially into the groove 55, and be supported by the angular sides of the groove 55. The heavy duty bracket will span the groove and lock over the overall thickness of the strip 17. The light bracket 53 will extend to the bottom of the V-shaped groove and engage against the front and back wall so that it also is held in tightly engaged position in the bracket strip 17.

The opening 50 for the heavy duty bracket 18 (presently standard) is of sufficient span to fit over the entire thickness of the bracket strips 17, 17 while the span of the opening 50 for the intermediate brackets and light duty brackets also are presently made with the opening 50 decreasing in dimension to correspond to the thickness of the locking position in the step groove or V groove slotted strip 17, 17.

The operation of the invention and its use can be easily and quickly understood by reference to FIGURES 1 and 2 of the drawings wherein a composite post 15 is shown which is mounted in a heavy foundation member 58 which is sufficiently heavy to maintain the post 15 in erect position when carrying the load imposed thereon without danger of the structure tipipng over. A stack-on base member 59 is placed upon the foundation member 58 and lower brackets 18, 18 secured to the post 15 upon one side only by being inserted through the open channel 44 and through a bracket strip 17 as shown in FIGURE 4 of the drawings and shelves 60, 60 placed thereon with other brackets 52, 52 being secured to the upper portion of the post 15 with shelves 62, 62 secured upon the brackets 52, 52 which shelves 62, 62 are narrower than the shelves 61, 61 secured to the intermediate portion of the post 15. A plurality of merchandise packages such as gallon paint cans 63, 63 are stored on the foundation 59 and other packages of merchandise 64, 64 are placed on the upper shelves. These packages of merchandise could be quart cans of paint or other smaller sized merchandise so that a complete shelving arrangement is provided at one side of the post 15.

In FIGURE 2 a similar stack of shelves and merchandise is shown with the brackets being secured to the opposite side of the post 15 with the brackets, shelving, and merchandise being located in precisely the same manner as that described hereinabove as applied to a single stack of merchandise. Likewise, file drawer bulkheads can be secured to the posts 15 by means of hooks formed at the sides of the bulkheads or brackets welded there if secured.

The units such as are illustrated can be disassembled and various other arrangements such as open closets can be provided and parts used for display purposes and the like in all kinds of merchandise and re-used in the make-up of such display units as often as may be desired.

While I have described more or less precisely the method employed and the apparatus used therewith, I do not wish to be understood as limiting myself thereto, as I contemplate changes in form and the proportion of parts and the substitution of equivalents as circumstances may suggest or render expedient without departing from the spirit or scope of my invention.

What is claimed is:

1. A support unit comprising an integrally formed part of two channel shaped portions in back-to-back relation with each other having a central connecting portion of the webs acting as a spacer, with L-shaped portions integrally formed on the edges of the flanges of each of the said portions, the leg portions of each of the said L-shaped portions adjacent each other being inwardly turned toward each other and spaced from the flange portion to which they are attached whereby longitudinally extending transverse channels are formed adjacent the edges of the support unit and bracket strips having spaced openings therein mounted in each of said channels.

2. A support unit comprising a main post having a channel longitudinally thereof adjacent one of its edges and a bracket mounting strip in the said channel, the bracket mounting strip having a plurality of alined spaced openings therein and having web portions between each pair of openings, the said web portions having vertically extending channels in the faces thereof of variable cross-section width whereby brackets of varying thickness may be received in the said channels.

3. A support unit comprising a main post having a channel longitudinally thereof adjacent one of its edges and a bracket mounting strip in the said channel, the bracket mounting strip having a plurality of aligned spaced openings therein and having web portions between each pair of openings, the said web portions having vertically extending channels in the faces thereof of variable cross-section width, with stepped side walls within the said grooves, whereby brackets of varying thickness may be received in the said channels.

4. A support unit comprising a main post having a channel longitudinally thereof adjacent one of its edges and a bracket mounting strip in the said channel, the bracket mounting strip having a plurality of aligned spaced openings therein and having web portions between each pair of openings, the said web portions having vertically extending channels in the faces thereof of variable cross-section width of a truncated V-shape in cross-section, whereby brackets of varying thickness may be received in the said channels.

5. A support unit adapted to be employed in a structural assembly comprising, a main post adapted to be vertically supported, said main post containing a longitudinally extending bracket mounting portion, said bracket mounting portion having a plurality of longitudinally spaced openings therein and having web portions between each pair of said openings, said web portions having on the outside faces thereof below said openings vertically extending channels of variable cross-sectional width for receiving brackets of varying thicknesses.

References Cited by the Examiner
UNITED STATES PATENTS

| 2,783,961 | 3/57 | Weber | 248—243 |
| 2,991,040 | 7/61 | Levy | 248—356 |
| 3,096,733 | 7/63 | Jentzen | 108—158 |

FOREIGN PATENTS

| 547,943 | 10/57 | Canada. |
| 1,117,567 | 2/56 | France. |
| 379,491 | 9/32 | Great Britain. |

CLAUDE A. LE ROY, *Primary Examiner.*